United States Patent [19]

Vignaud

[11] Patent Number: 4,606,984

[45] Date of Patent: Aug. 19, 1986

[54] PROCESS FOR STABILIZING PRIMARY ELECTROCHEMICAL GENERATORS WITH REACTIVE ANODES MADE FROM ZINC, ALUMINIUM OR MAGNESIUM AND AN ANODE FOR SUCH A GENERATOR STABILIZED BY THIS PROCESS

[75] Inventor: René Vignaud, Aulnay-sous-Bois, France

[73] Assignee: Societe Les Piles Wonder, France

[21] Appl. No.: 749,929

[22] Filed: Jun. 27, 1985

[30] Foreign Application Priority Data

Jul. 4, 1984 [FR] France ................... 84 10632

[51] Int. Cl.⁴ ............................................. H01M 4/60
[52] U.S. Cl. ..................................... 429/212; 429/50; 429/231
[58] Field of Search ................ 429/229–231, 429/212, 50, 218

[56] References Cited

U.S. PATENT DOCUMENTS

| 2,880,122 | 3/1959 | Morehouse et al. | 429/212 X |
| 3,156,587 | 11/1964 | Wolfe, Jr. | 429/212 X |
| 3,847,669 | 11/1974 | Paterniti | 136/30 |
| 4,040,916 | 8/1977 | Will et al. | 204/55 R |
| 4,195,120 | 3/1980 | Rossler et al. | 429/50 |
| 4,216,045 | 8/1980 | Morioka | 429/212 X |

OTHER PUBLICATIONS

89, Chemical Abstracts, 149502k (1978).

*Primary Examiner*—Charles F. LeFevour
*Attorney, Agent, or Firm*—Brumbaugh, Graves, Donohue & Raymond

[57] ABSTRACT

A process is provided for stabilizing a primary electrochemical generator comprising at least one reactive anode made from a metal chosen from the group comprising zinc, aluminium and magnesium, characterized in that to said electrode is added a percentage of 0.01% to 1% by weight with respect to the metal, of at least one perfluorated organic compound of the ethoxylated fluoroalcohol type. It also relates to an anode obtained by the above mentioned process and a primary electrochemical generator, with alkaline or saline electrolyte, comprising an anode of this type.

11 Claims, No Drawings

PROCESS FOR STABILIZING PRIMARY ELECTROCHEMICAL GENERATORS WITH REACTIVE ANODES MADE FROM ZINC, ALUMINIUM OR MAGNESIUM AND AN ANODE FOR SUCH A GENERATOR STABILIZED BY THIS PROCESS

The invention relates to primary electrochemical generators, or electric cells, comprising very reactive anodes made from zinc, aluminium or magnesium, more especially of the maganese dioxide/zinc, silver oxide/-zinc, mercury oxide/zinc, air/zinc, silver chloride/-magnesium and air/aluminium type, with an alkaline or saline electrolyte, such as an aqueous solution of potash or zinc chloride and ammonium chloride respectively, in which solution the anode is corrodable.

Although such cells allow high energies to be obtained, they present, because of the corrodability of their reactive anodes in the alkaline or saline electrolyte, a fairly reduced stability with
- loss of the capacity of the cell during storage resulting from partial solubilization of the anode in the electrolyte,
- continuous and considerable release of hydrogen gas causing the ejection of electrolyte and swelling or even bursting of the cell, the amplitude of these harmful phenomena being increased with a rise in temperature, for example in the case of storage in a hot country.

To overcome these drawbacks and stabilize a cell of the above mentioned type, having more especially an alkaline electrolyte, proposals have been made to stabilize it either by incorporating mercury in the anode (with formation of an amalgam) in the case of zinc, or by adding certain organic compounds.

It was first of all proposed to incorporate a certain percentage of mercury, for example from 5 to 15% by weight with respect to the active metal, in the case where this latter is formed from zinc, more especially for an alkaline electrolyte cell.

In fact, mercury has the property of increasing the hydrogen over-pressure of the metal in which it is incorporated (and this all the more so the higher its concentration therein) by inhibiting the reaction reducing the proton. Unfortunately mercury, and more particularly its compounds, are toxic. This involves strict safety measures in the indutrial manufacturing process and, moreover, the cells thrown away after use constitute a dangerous cause of pollution.

It is therefore desirable to avoid using mercury or at least in reducing the mercury content in cells for ecological reasons. Moreover, regulations tend to gradually limit this content.

But a mercury content with respect to zinc in the anode less than about 3% by weight does not provide sufficient stability for alkaline electrolyte cells.

It has further been proposed to add to a cell having a zinc, aluminium or magnesium anode, for stabilizing it, a certain number of organic compounds, such as oleic acid diethanolamine, monolaurylether, amines, quaternary ammonium compounds and some ethylene oxide polymers for replacing the mercury wholly or partially (e.g. U.S. Pat. No. 4,195,120 and French Pat. No. 2,156,662).

Such compounds unfortunately do not provide sufficient stability and are themselves often difficult to use or of reduced efficiency.

The applicant has now discovered that it was possible to stabilize a zinc, aluminium or magnesium reactive anode of a primary electrochemical generator, having an alkaline or saline electrolyte, by incorporating in the anode a very small amount (generally less than 1%) of a perfluorated organic compound of the ethoxylated polyfluoroalcohol type, the anode, when it is made from zinc, preferably having a small mercury content added thereto, of the order of 0.2% to 2%, particularly in the case of alkaline electrolyte cells.

Although it is exact that it has already been proposed to incorporate such compounds in electrochemical generators (published Japanese patent application No. 78/67. 834 of the 16th June 1978 referenced in Chemical Abstracts volume 89, 1978, No. 149.502), this incorporation concerned exclusively secondary generators (accumulators) and had a different aim, namely that of increasing the life span of such secondary generators by improving the charge/discharge cycles by reducing the precipitation of the zinc of the anodes during charging.

The invention has then as object:
- a process for stabilizing a primary electrochemical generator comprising at least one reactive anode made from a metal taken from the group comprising zinc, aluminium and magnesium, characterized in that to said electrode there is added a percentage of 0.01% to 1%, by weight with respect to the metal, of at least one perfluorated organic compound of the ethoxylated fluoro-alcohol type;
- a stabilized anode obtained by this process; and
- an electric cell comprising such an anode.

Preferably, when the anode is made from zinc, mercury is preferably added thereto but in a relatively small amount, less than 2% by weight with respect to the zinc, particularly when it is intended for an alkaline electrolyte generator.

The perfluorated compound advantageously has the formula:

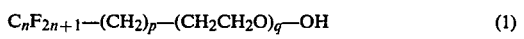

$$C_nF_{2n+1}-(CH_2)_p-(CH_2CH_2O)_q-OH \qquad (1)$$

in which
n is between 4 and 20, preferably between 6 and 8;
p is between 1 and 10 and is preferably close to 2; and
q is between 3 and 40, preferably between 10 and 12.

A single compound may be used corresponding to formula (1) or else a mixture of two or more compounds corresponding to this formula.

It is also possible to use a non saturated perfluorated organic compound of formula:

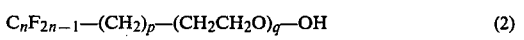

$$C_nF_{2n-1}-(CH_2)_p-(CH_2CH_2O)_q-OH \qquad (2)$$

in which n, p and q have the same meaning as in formula (1).

With the invention, corrosion of the metal of the anode is reduced and decrease in the capacity of the cell during storing, the release of hydrogen, electrolyte leaks and swelling of the cell are avoided, without the need of an addition of mercury or, at the least for a zinc electrode, with an addition of mercury in reduced proportions corresponding to the standards and ecological requirements.

The invention will in any case be well understood from the complement of description which follows which complement is of course given especially by way of indication.

A. Zinc electrode for so called "alkaline" cell with alkaline electrolyte.

An anode mixture is prepared for forming the negative electrode, or anode, of a cell by successively introducing into a mixture zinc powder amalgamated to 1%, a 40% potash solution, a gelling agent such as carboxymethylcellulose and the inhibitor of the invention, namely in the proportion of 500 ml of potash solution and 50 g of carboxymethylcellulose per kilo of amalgamated zinc.

The inhibitor may be distributed on the surface of the amalgamated zinc using a non aqueous solvent, such as ethyl alcohol or acetone) which is then evaporated, or by mixing the inhibitor with the potash solution.

The anode mass thus obtained is tested in a 10 N potash solution at 45° C. and the corrosion rate is measured in μl/g/day (microliter of CTPN hydrogen per gram of zinc and per day). A rate higher than 10 μl/g/day is unacceptable in an electrochemical generator. It is in fact known that the corrosion rate (determined by the volume of hydrogen freed per gram of sample and per day, when this sample is immersed in the electrolyte in question is widely used for testing amalgamated samples and shows a very good correlation with the effective conservation of electrochemical generators. For accelerating the test, it is generally carried out at 45° C.

By way of comparison, a non amalgamated zinc powder has a corrosion rate considerably higher than 10 μl/g/day (of the order of 2000 μl/g/day); amalgamated at 0.2% it has a corrosion rate of the order of 2000 μl/g/day, at 1% a corrosion rate of the order of 20 μl/g/day, so still greater than 10μl/g/day; amalgamated at 5% gives a corrosion rate of about 1.5 μl/g/day, this latter being acceptable in most generators.

EXAMPLE 1

The inhibitor is formed by the perfluorated organic compound of formula:

$$C_6F_{13}C_2H_4(C_2H_4O)_qOH \qquad (3)$$

in which q is close to 12.

This formula corresponds substantially to the product FORAFAC 1110 commercialized by the firm Atochem.

The proportion of inhibitor used is 0.01% by weight with respect to the zinc.

The corrosion rate is measured and 0.7 μl/g/day was found.

EXAMPLES 2 AND 3

Example 1 was repeated but with a zinc electrode amalgamated to 0.2% and non amalgamated zinc.

The table hereafter gives a comparision of corrosion rate measurements, without inhibitor, in accordance with the invention and with the inhibitor of formula (3) at 0.1%, with the zinc electrodes having different amalgamation rates and a non amalgamated zinc electrode.

| Amalgamation Rate % by weight of Hg with respect to the zinc | Corrosion Rate without inhibitor of formula (3) | ul/g/day with inhibitor of formula (3) |
|---|---|---|
| 5% | 1.5 | — |
| 1% | 20 | 0.7 |
| 0.2% | 200 | 5 |
| 0 | 2000 | 20 |

EXAMPLE 4

Example 1 was repeated by replacing compound (3) by the following mixture:

$$C_6F_{13}C_2H_4(C_2H_4O)_{14}OH \qquad (4)$$

and $$C_{10}F_{21}C_2H_4(C_2H_4O)_{14}OH$$

with a mean molecular mass corresponding to the compound $$C_7F_{15}\ C_2H_4\ (C_2H_4O)_{14}\ OH$$

the corrosion rate measured in accordance with the above defined method was 0.8 μl/g/day for a proportion of 0.1% of the above mixture (4).

EXAMPLE 5

Example 1 was repeated and using, in place of the compound (3), 0.01% of the non saturated perfluorated compound:

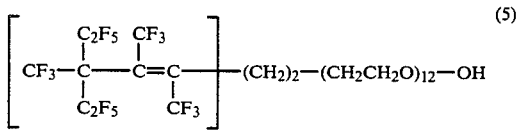

(5)

The corrosion rate measured in accordance with the above described method was 1.9 μl/g/day.

Example of industrial application in an alkaline generator with a zinc electrode.

Primary generators, such as described in French Pat. No. 2 503 935 of the applicant, have been mounted in two series:
- one comprising an anode mass formed of zinc powder amalgamated to 5%, an electrolyte formed by a 40% potash solution and a gelling agent (carboxymethylcellulose), the proportions being 300 ml of potash solution and 25 g of carboxymethylcellulose per kilo of amalgamated zinc;
- the other comprising, in the same electrolyte and the same gelling agent, an anode mass whose zinc powder is only amalgamated to 1%, but in which, during mixing with the electrolyte and the same gelling agent, the above mentioned FORAFAX 1110 was introduced in a proportion of 0.1% by weight with respect to the zinc.

The two series were stored for three months at 45° C. After this storage period, observation showed no sweating on the outside of the cells due to a possible overpressure. On dismantling the cells no expansions of the anode gel was discovered.

Finally the elements of these two series, the modulus R2O, discharged across 3.9 ohms under continuous operating conditions, present the same dispersion in the discharge duration 59 h±1h, that is to say that there is no loss of capacity of the cells of the second series with respect to those of the first.

B. Zinc electrode for so called "saline" cells with saline electrolyte.

It is well known that cells of the manganese dioxide/zinc type, so called "saline cells", use an electrolyte formed from an aqueous solution of zinc chloride and ammonium chloride, in which the zinc electrode tends to corrode and form hydrogen, which results in causing leaks of electrolyte by perforating the zinc case, and losses of capacity during storage.

The zinc electrode of these cells is formed from metal foil, so less reactive than the divided powder of alkaline generators. This zinc foil is only amalgamated on the surface, the weight of mercury per cell is consequently 1000 times smaller than that required for so called "alkaline" cells with alkaline electrolyte.

The inhibitor effect of the compound of the invention is shown by the corrosion test carried out at 45° C. in a saline solution comprising 25% by weight of $Cl_2Zn$, 25% by weight of $NH_4Cl$ and the complement made up with water.

The use of powdered zinc test pieces has the advantage of giving a rapid and statistically more homogeneous response. In fact, the tongues cut out from cell case have great structural heterogeneity because of the extrusion lines of the tube, and consequently a great dispersion in the responses to the corrosion test.

The ratio of the active surfaces and consequently of the corrosion rates between the powder and the foil is close to 5000.

The following corrosion rates were obtained:

| | |
|---|---|
| reference electrode without mercury and without inhibitor according to the invention | 2000 μl/g/day |
| electrode with 0.01% by weight of the above compound (3) | 340 μl/g/day |
| electrode with 5% by weight of mercury | 175 μl/g/day |

The inhibiting effect of the perfluorated compound of the ethoxylated fluoroalcohol type is very clear, even in a saline environment.

As is evident and as it follows moreover already from what has gone before, the invention is in no wise limited to those of its modes of application and embodiments which have been more especially considered; it embraces, on the contrary, all variants thereof.

It should be noted that, if U.S. Pat. No. 4,040,916 discloses a "method for forming a non-dendritic zinc layer which comprises providing a deposition solution containing a zinc compound and from 0.001 to 10 weight percent of a non-ionic surfactant additive which has the formula:

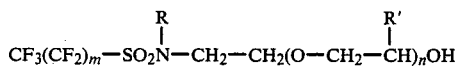

where m is a number from 3 to 15, R is alkyl radical having from 1 to 10 carbon atoms, R' is a member of a group consisting of hydrogen and methyl radical, n is a number for the group from 0 to 30, and the surfactant additive has a molecular weight range of approximately 550-1500; positioning a pair of spaced apart electrodes within the deposition solution, applying an electric current to the electrodes, and depositing a non dendritic zinc layer on the negative electrode" (claim 1), the additive and the function thereof are different in said U.S. patent and in the present patent application.

I claim:

1. Process for stabilizing a primary electrochemical generator comprising at least one reactive anode made from a metal taken from the group consisting of zinc, aluminium and magnesium, characterized in that there is added to said electrode a percentage of 0.01% to 1% by weight with respect to the metal of at least one perfluorated organic compound of the ethoxylated fluoroalcohol type.

2. The stabilization process according to claim 1, characterized in that the anode, being made from zinc, comprises mercury in an amount less than 2% by weight with respect to the zinc, more especially when it is intended for an alkaline electrolyte generator.

3. The stabilization process according to claim 1 or 2, characterized in that the perfluorated compound corresponds to the formula:

$$C_nF_{2n+1}-(CH_2)_p-(CH_2CH_2O)_q-OH \quad (1)$$

in which:

n is between 4 and 20, preferably between 6 and 8;
p is between 1 and 10 and is preferably close to 2. and
q is between 3 and 40, preferably between 10 and 12.

4. The stabilization process according to claim 3, characterized in that the perfluorated organic compound has the formula:

$$C_6F_{13}C_2H_4(C_2H_4O)_qOH \quad (3)$$

in which q is close to 12.

5. The stabilization process according to claim 3, characterized in that a mixture of two or more compounds according to the formula (1) of claim 3, are used.

6. The stabilization process according to claim 5, characterized in that polyfluorated organic is formed by the mixture of the two following compounds:

$$C_6F_{13}C_2H_4(C_2H_4O)_{14}OH \quad (4)$$

and $$C_{10}F_{21}C_2H_4(C_2H_4O)_{14}OH$$

with a mean molecular mass corresponding to the compound:

$$C_7F_{15}C_2H_4(C_2H_4O)_{14}OH.$$

7. The stabilization process according to claim 1 or 2, characterized in that the perfluorated organic compound corresponds to the formula:

$$C_nF_{2n-1}-(CH_2)-(CH_2CH_2O)\;q-OH \quad (2)$$

in which:

n is between 4 and 20, preferably between 6 and 8;
p is between 1 and 10 and is close to 2;
q is between and 3 and 40, preferably between 10 and 12.

8. The stabilization process according to claim 7, characterized in that the perfluorated compound corresponds to the formula:

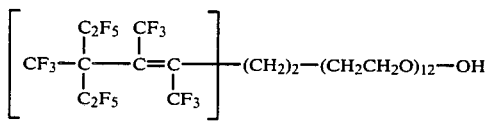 (5)

9. An anode for a primary electrochemical generator obtained by the process according to any one of the preceding claims.

10. A primary electrochemical generator with alkaline electrolyte, characterized in that it comprises an anode according to claim 9, particularly with the limitation according to claim 2.

11. A primary electrochemical generator with saline electrolyte, characterized in that it comprises an anode according to claim 9.

* * * * *